United States Patent
Linder

(10) Patent No.: US 8,639,653 B2
(45) Date of Patent: Jan. 28, 2014

(54) METHODS, SYSTEMS, AND COMPUTER PROGRAM PRODUCTS FOR MANAGING BATCH OPERATIONS IN AN ENTERPRISE DATA INTEGRATION PLATFORM ENVIRONMENT

(75) Inventor: Kyle Linder, Belleville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1010 days.

(21) Appl. No.: 12/333,733

(22) Filed: Dec. 12, 2008

(65) Prior Publication Data

US 2010/0153952 A1 Jun. 17, 2010

(51) Int. Cl.
*G06F 7/00* (2006.01)
*G06F 17/00* (2006.01)

(52) U.S. Cl.
USPC .................... 707/602; 707/687; 718/103

(58) Field of Classification Search
None
See application file for complete search history.

(56) References Cited

U.S. PATENT DOCUMENTS

| | | | | |
|---|---|---|---|---|
| 6,874,010 | B1 * | 3/2005 | Sargent | 709/203 |
| 7,058,615 | B2 * | 6/2006 | Yao | 706/12 |
| 7,299,216 | B1 * | 11/2007 | Liang et al. | 1/1 |
| 7,571,191 | B2 * | 8/2009 | Dill et al. | 1/1 |
| 7,720,804 | B2 * | 5/2010 | Fazal et al. | 707/601 |
| 7,941,397 | B2 * | 5/2011 | Wilms et al. | 707/602 |
| 8,041,760 | B2 * | 10/2011 | Mamou et al. | 709/200 |
| 8,214,339 | B2 * | 7/2012 | Breeds et al. | 707/701 |
| 2004/0249644 | A1 * | 12/2004 | Schiefer et al. | 705/1 |
| 2006/0253472 | A1 * | 11/2006 | Wasserman et al. | 707/100 |
| 2008/0033995 | A1 * | 2/2008 | Casati et al. | 707/104.1 |
| 2008/0243884 | A1 * | 10/2008 | Mehta | 707/100 |
| 2009/0177671 | A1 * | 7/2009 | Pellegrini et al. | 707/100 |

OTHER PUBLICATIONS

Informatica PowerCenter, retrieved online on Nov. 4, 2008; retrieved from the Internet http://www.informatica.com/PRODUCTS.SERVICES/POWERCENTER/Pages/index.aspx, 3 pages.

* cited by examiner

*Primary Examiner* — Fred I Ehichioya
*Assistant Examiner* — Michelle Owyang
(74) *Attorney, Agent, or Firm* — Cantor Colburn LLP

(57) ABSTRACT

Methods, system, and computer program products for managing batch operations are provided. A method includes defining a window of time in which a batch will run by entering a batch identifier into a batch table, the batch identifier specifying a primary key of the batch table and is configured as a foreign key to a batch schedule table. The time is entered into the batch schedule table. The method further includes entering extract-transform-load (ETL) information into the batch table. The ETL information includes a workflow identifier, a parameter file identifier, and a location in which the workflow resides. The method includes retrieving the workflow from memory via the workflow identifier and location, retrieving the parameter file, and processing the batch, according to the process, workflow, and parameter file.

6 Claims, 11 Drawing Sheets

FIG. 6A

PCF_SCHED 600A

| BTCH_ID | STRT_DT | END_DT | BTCH_TYPE | CLNDR_ID |
|---|---|---|---|---|
| 1 | 1/1/06 1:00PM | 12/31/06 2:00PM | DAILY | |
| 2 | 1/1/06 1:00PM | 12/31/06 2:00PM | DAILY | |
| 2 | 1/1/06 3:00PM | 12/31/06 5:00PM | DAILY | |
| 3 | 1/1/06 3:00PM | 1/31/06 5:00PM | DAILY | |
| 3 | 2/1/06 4:00PM | 3/31/06 6:00PM | DAILY | |
| 3 | 4/1/06 3:00PM | 12/31/06 5:00PM | DAILY | |
| 4 | 1/1/06 1:00PM | 12/31/06 2:00PM | MONTHLY | |
| 5 | 3/20/06 1:00PM | 12/20/06 2:00PM | MONTHLY | |
| 6 | 3/20/06 1:00PM | 12/31/06 2:00PM | MONTHLY | |
| 7 | 3/5/06 1:00PM | 12/5/06 2:00PM | MONTHLY | |
| 7 | 3/20/06 1:00PM | 12/20/06 2:00PM | MONTHLY | |
| 8 | 3/20/06 3:00PM | 3/20/06 5:00AM | MONTHLY | |
| 9 | 3/20/06 1:00PM | 12/20/06 2:00PM | MONTHLY | |
| 9 | 3/20/06 4:00PM | 12/20/06 10:00PM | MONTHLY | |

602 — 604 — 606 — 608 — 610

| PCF_RETRY |||| 
|---|---|---|---|
| BTCH_ID | RETRY_SEQ | RETRY_WAIT | RETRY_ATMPTS |
| 1 | 1 | 5 | 10 |
| 2 | 1 | 240 | 5 |
| 3 | 1 | 10 | 1 |
| 3 | 2 | 60 | 1 |
| 4 | 1 | 5 | 0 |

*FIG. 6C*

| PCF_EMAIL ||| 
| --- | --- | --- |
| BTCH_ID | BTCH_STS | EMAIL_ADDR |
| 1 | DATALOADED | xxxxxx@att.com |
| 2 | FAILED | xxxxxx@att.com |
| 3 | EXPIRED | xxxxxxx@att.com |
| 3 | EXPIRED | xxxxxxx@att.com |
| 4 | FAILED | xxxxxxx@att.com |
| 4 | EXPIRED | xxxxxxx@att.com |

*FIG. 6D*

METHODS, SYSTEMS, AND COMPUTER PROGRAM PRODUCTS FOR MANAGING BATCH OPERATIONS IN AN ENTERPRISE DATA INTEGRATION PLATFORM ENVIRONMENT

BACKGROUND

The present invention relates generally to data processing, and more particularly, to managing batch operations in an enterprise data integration platform environment.

Data warehouse systems provide businesses with useful and meaningful data that can be used to support decision making with respect to various aspects of a business enterprise. Data from various enterprise databases may be extracted and combined within a data warehouse supported by the data warehouse system using, e.g., an Extract, Transfer, and Load (ETL) tool. The ETL tool typically includes a scheduling component that ensures operations on the data are performed in a set order.

These ETL processes may be implemented in conjunction with other applications (e.g., business applications of the enterprise). A process schedule is devised and read by the scheduling component, which accesses one or more of the applications based upon the information in the schedule to perform the operations in the process schedule.

Scheduling tasks performed by existing ETL tools offer limited flexibility in terms of error logging, implementing batch dependencies, and messaging, to name a few. This is because many of these features are typically hard coded into the ETL tools, thereby offering little in the way of customization.

What is needed, therefore, is a way to provide increased flexibility and customization in batch scheduling processes.

BRIEF SUMMARY

Exemplary embodiments include methods for managing batch operations in an enterprise data integration platform environment. A method includes defining a window of time in which a batch will run by entering a batch identifier into a batch table, the batch identifier specifying a primary key of the batch table and is configured as a foreign key to a batch schedule table. The time is entered into the batch schedule table. The method further includes entering a workflow identifier into the batch table, which specifies a workflow for executing a batch process. The method also includes entering a parameter file identifier into the batch table, which specifies a parameter file for running the process. The method also includes entering a location in which the workflow resides, retrieving the workflow from memory via the workflow identifier and location, retrieving the parameter file, and processing the batch, according to the process, workflow, and parameter file.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIGS. 6A-6D depict process control framework schedules with sample data in accordance with exemplary embodiments.

The detailed description explains the exemplary embodiments, together with advantages and features, by way of example with reference to the drawings.

DETAILED DESCRIPTION OF EXEMPLARY EMBODIMENTS

In accordance with exemplary embodiments, batch operations management in an enterprise data integration platform environment is provided. The operations management described in these exemplary embodiments is implemented via a process control framework that provides flexibility and customization in batch scheduling processes. Customization features of the process control framework enable users in the environment to perform a wide variety of functions, e.g., specify batch windows in which a batch will run, define complex dynamic batch dependencies, configure email messaging rules that notify enterprise entities of a batch status, dynamically specify batch restarts that indicate a number of retry attempts and/or corresponding retry timeframes, perform automatic error logging functions, and customize batch throttling functions, to name a few.

Figure 1:
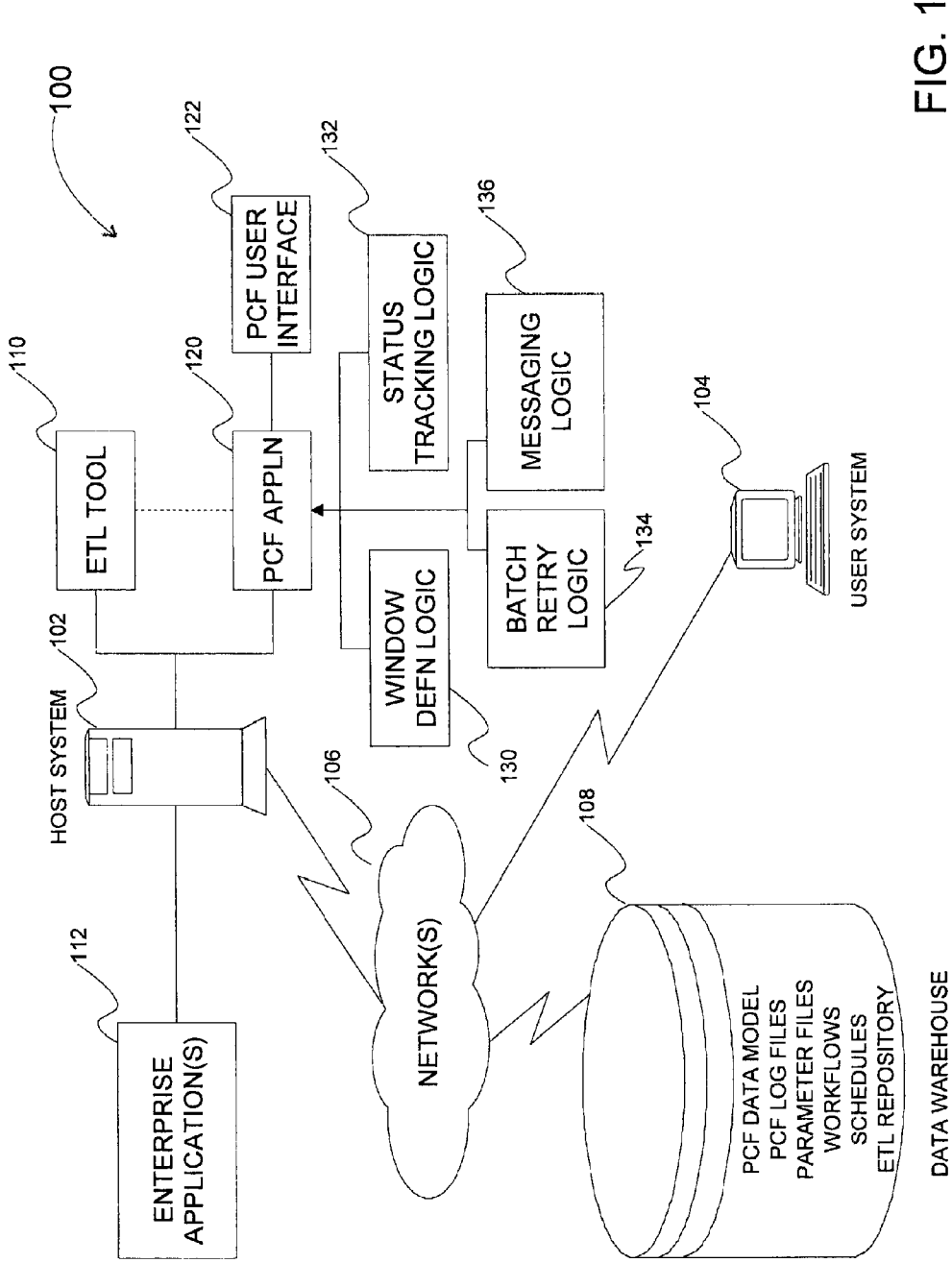
FIG. 1 is a block diagram of a system upon which a process control framework may be implemented in accordance with exemplary embodiments.

Turning now to FIG. 1, a block diagram of a system 100 upon which the process control framework may be implemented in accordance with exemplary embodiments will now be described. In one exemplary embodiment, the system of FIG. 1 includes a host system 102 in communication with a user system 104 and a data warehouse 108 over one or more network(s) 106. The system 100 may be implemented by a business enterprise.

The user system 104 may be operated by a user of the business enterprise for performing various activities pursuant to the business needs. In an exemplary embodiment, the user accesses the host system 102 to implement the features and functions of the process control framework as will be described. The user system 104 may be implemented using a general-purpose computer executing a computer program for carrying out the processes described herein. While only one user system 104 is shown in the system of FIG. 1, it will be understood that many user systems 102 may be implemented in order to realize the advantages of the process control framework.

The host system 102 may be implemented using one or more servers operating in response to a computer program stored in a storage medium accessible by the server(s). The host system 102 may operate as a network server (e.g., a web server) to communicate with the user system 104 and other network entities, e.g., the data warehouse 108. The host system 102 handles sending and receiving information to and from the user system 104 and can perform associated tasks. The host system 102 executes one or more enterprise applications 112 in furtherance of the business goals of the enterprise. In addition, the host system 102 executes an ETL (Extract Transform Load) tool 110 for performing data processing, including data mining and integration activities, among others. For example, the ETL tool 110 may be Informatica® PowerCenter™. In an exemplary embodiment, the host system 102 also executes a process control framework (PCF) application 120 to provide the batch operations scheduling and management activities described herein. As indicated above, the PCF provides advanced and customized functionality to the ETL processes performed in the data integration platform environment of FIG. 1. It will be understood, however, that the existing ETL scheduling processes may be implemented without the advanced PCF functionality in situations where no customization is desired. In this scenario, the ETL tool 110 uses information in an ETL repository in the data warehouse 108, without the assistance of the PCF application 120, to implement basic scheduling operations. The PCF application 120 includes window definition logic 130, status tracking logic 132, batch retry logic 134, and messaging logic 136. These items are described further herein.

The host system 102 is in communication with the data warehouse 108. The data warehouse 108 may be implemented using memory contained in the host system 102 or it may be a separate physical or logical device. In the exemplary embodiment shown in FIG. 1, the host system 102 is in communication with the data warehouse 108 over the network(s) 106. In an alternative exemplary embodiment, the host system 102 may be in direct communication with the data warehouse 108 (via, e.g., physical cabling). It will be understood, however, that other network implementations may be utilized. For example, the data warehouse 108 may be logically addressable as a consolidated data source across a distributed environment that includes one or more of the networks 106. Information stored in the data warehouse 108 may be retrieved and manipulated via the host system 102. The data warehouse 108 stores a variety of information for use in implementing the process control framework activities described herein. As shown in FIG. 1, e.g., the data warehouse 108 stores a PCF model, PCF log files, PCF parameter files, PCF workflows, PCF schedules, and an ETL repository, which stores a variety of information used by the ETL tool 110. The data model is described further in FIG. 2 and the PCF schedules are described further in FIGS. 6A-6D. As indicated above, the existing ETL scheduling processes may be implemented without the advanced PCF functionality in situations where no customization is desired. In this scenario, the ETL tool 110 uses information in an ETL repository in the data warehouse 108, without the assistance of the PCF application 120, to implement basic scheduling operations. However, when customization is desired for the batch scheduling operations, the PCF application 120 (in cooperation with the PCF model, PCF parameter files, and workflows) facilitate respective customization options through the ETL tool 110 without modifying any ETL tool 110 code, as will be described further herein.

Network(s) 106 may include any type of known network including, but not limited to, a wide area network (WAN), a local area network (LAN), a global network (e.g. Internet), a virtual private network (VPN), and an intranet. The network(s) 106 may be implemented using a wireless network or any kind of physical network implementation known in the art. A user system 104 may be coupled to the host system 102 through multiple networks (e.g., intranet and Internet) so that not all user systems 104 are coupled to the host system 102 through the same network.

In one exemplary embodiment, the ETL tool 110 includes a scheduler component and accesses the enterprise applications 112 and ETL repository in the data warehouse 108 based upon a schedule of data used by the ETL tool 110 in order to implement ETL processes. The PCF application 120 may be integrated with the ETL tool 110 or may be a separate application that interfaces with an existing commercial scheduler, e.g., the scheduler component of the ETL tool 110. As shown in FIG. 1, the PCF application 120 is implemented as a separate interface to the scheduler of the ETL tool 110. As indicated above, the PCF application 120 is configured in a manner such that no modifications to the ETL tool 110 scheduler code are required. For example, the PCF application 120 may be implemented by changing one or more parameter files in the ETL tool 110 scheduler, such that PCF application names are substituted for names of the enterprise applications 112, thereby causing the ETL tool 110 scheduler to access the PCF application 120 instead of the corresponding enterprise application 112. In this manner, the PCF application 120 implements the processes identified in the batch schedule. In an exemplary embodiment, the PCF application 120 includes a user interface 122, which may be accessed by a user system (e.g., user system 104) to configure the batch schedules, view batch execution details, as well as send and receive messages relating to the batch execution. This PCF user interface 122 is described further herein.

Figure 2:
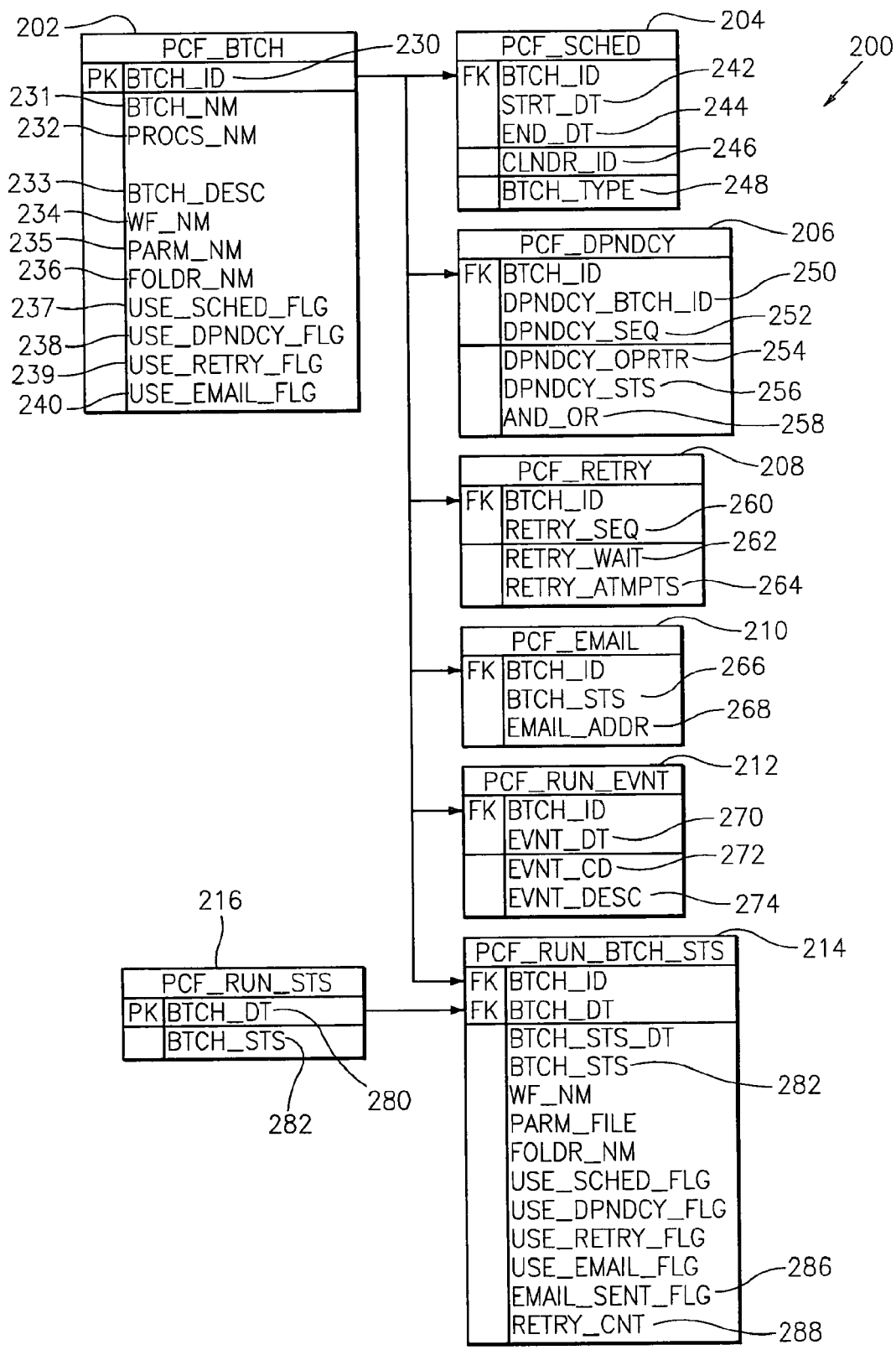
FIG. 2 depicts a process control framework data model in accordance with exemplary embodiments.
Figure 3:
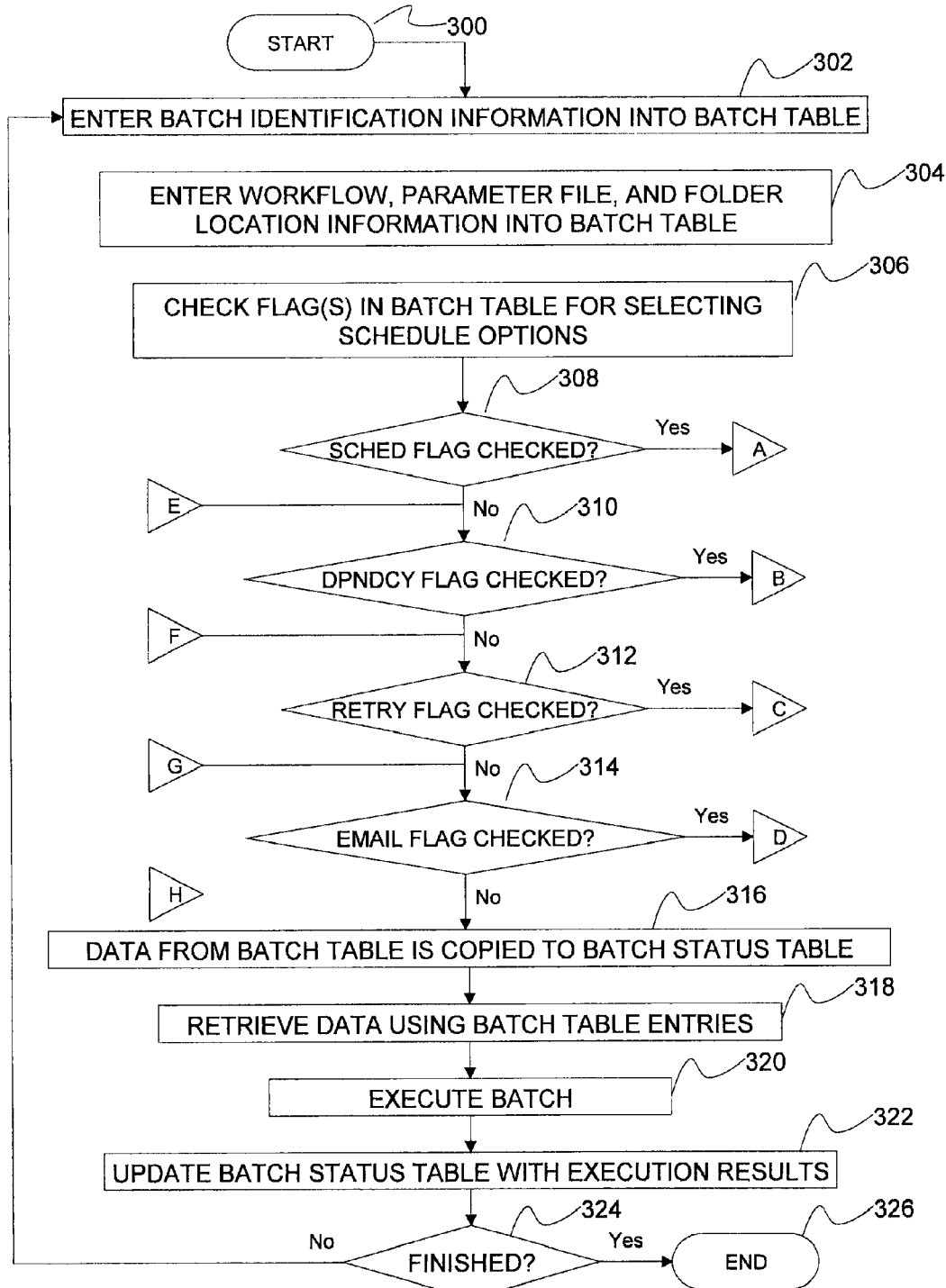
FIG. 3 is a flow diagram describing a process for implementing the process control framework in accordance with exemplary embodiments.

Turning now to FIG. 2, a data model 200 used by the PCF application 120 for implementing the process control framework will now be described in accordance with exemplary embodiments. The data model 200 shown in FIG. 2 illustrates various data structures used in implementing PCF tables in which data are entered and processed by the PCF application 120. It will be understood that the particular tables and fields described in FIG. 2 are provided for illustrative purposes and that other fields/tables may be added or substituted for those described herein in order to realize the advantages of the exemplary embodiments. As shown in FIG. 2, the data model 200 includes a PCF batch table (PCF_BTCH) 202, a PCF schedule table (PCF_SCHED) 204, a PCF dependency table (PCF_DPNDCY) 206, a PCF retry table (PCF_RETRY) 208, a PCF email table (PCF_EMAIL) 210, a PCF run event table (PCF_RUN_EVNT) 212, a PCF run batch status table (PCF_RUN_BTCH_STS) 214, and a PCF run status table (PCF_RUN_STS) 216. Tables 202-210 refer to batch set up tables, while tables 212-216 refer to batch status tables. In an exemplary embodiment, the PCF application 120 includes the PCF user interface 122, which may be a web-based component of the PCF application 120 and is used to input data for performing the PCF activities described herein. The data entered via the PCF user interface 122 may then be used to populate the various tables illustrated in the data model 200 of FIG. 2. The data provided in the populated tables of the data model 200 are then used to create and execute a batch schedule. A PCF user interface screen 400 of the PCF user interface 122 for inputting this data is shown in FIG. 4.

In an exemplary embodiment, the PCF batch table 202 is used to provide identifying information about a particular batch that will be processed via the process control framework; that is, the batch is defined for the PCF in order to then customize execution of batch processes for the batch. When a new PCF batch table 202 is created, a unique batch identifier is assigned via a BTCH_ID field 230 in the table 202. This may be an automated process performed by the PCF application 120. If automated, the batch identifier will be displayed to a user (e.g., a user at the user system 104 of FIG. 1) via the user interface screen 400 of FIG. 4 (e.g., via a batch ID field 402). Other identifying information related to a particular batch may be entered by the user.

Figure 4:
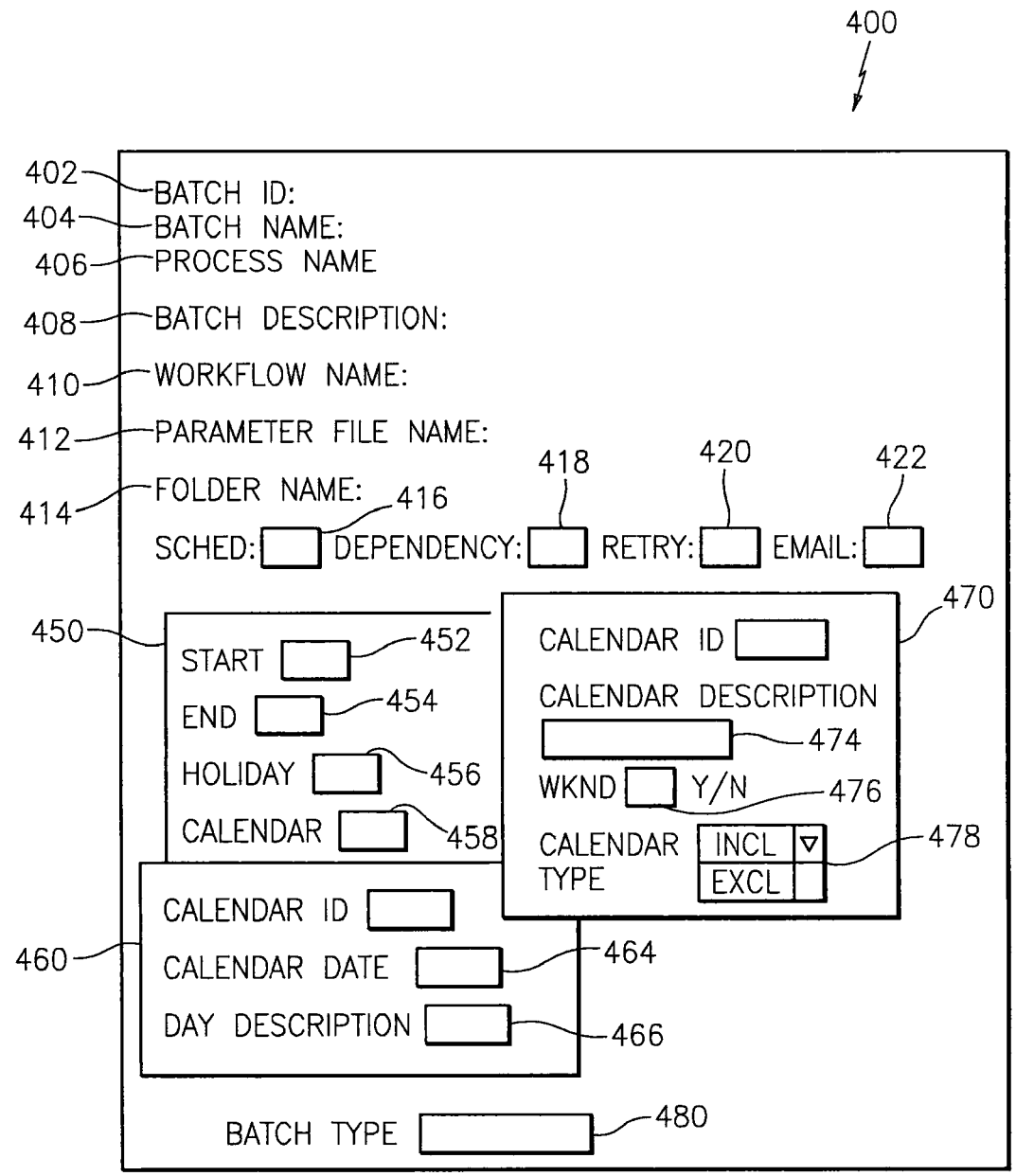
FIG. 4 depicts a user interface screen of the process control framework in accordance with exemplary embodiments.

As described above, this information may be entered via the PCF user interface screen 400 of FIG. 4. For example, a name given for the batch may be entered in a batch name field 404 of the user interface screen 400. This information is populated by the PCF application 120 into a BTCH_NM field 231 of the PCF batch table 202. Likewise, a descriptive name given to a process to be performed on the batch may be entered in a process name field 406 of the user interface screen 400. This information is also populated by the PCF application 120 into a PROCS_NM field 232 in the PCF batch table 202. Additionally, a detailed description of the batch may be entered in a batch description field 408 in the user interface screen 400, and the PCF application 120 populates a BTCH_DESC field 233 in the PCF batch table 202 with this information. A WF_NM field 234 in the table 202 may be used to enter the name of a workflow that is selected to run the particular process (e.g., the process identified in the PROCS_NM field 232) for the batch. In an exemplary embodiment, the workflows contain instructions for performing one or more batch processes and are accessed by the PCF application 120 execute a batch schedule according to these processes. For example, when the ETL tool 110 is prompted to access one or more enterprise applications 112 to execute a batch (whereby a schedule of the batch includes customized PCF processes), the PCF application 120 intercedes on behalf of the enterprise applications 112 to implement the PCF processes using the PCF tables in the data model 200, PCF parameter files, and workflows stored in the data warehouse 108. This is described further herein.

Turning back to FIG. 2, the user enters this workflow name information into a workflow name field 410 in the user interface screen 400. Also, a PARM_NM field 235 in the table 202 may be used to enter the name of a PCF parameter file (stored in the data warehouse 108) that is selected to run the process (e.g., the process identified in the PROCS_NM field 232) within the batch. This information is entered by the user in a parameter file name field 412 in the user interface screen 400. A user may further enter the name of a folder in which the workflow is stored via a folder name field 414 in the user interface screen 400, which is then populated into a corresponding FOLDR_NM field 236 in the PCF batch table 202.

In further defining the batch, the user may select from various options for customizing its execution. The PCF batch table 202 includes fields for storing options selected by a user via the PCF user interface 122. As indicated above, options may include, e.g., specifying batch windows in which a batch will run (via a USE_SCHED_FLG 237 of table 202), defining complex dynamic batch dependencies (via a USE_DPNDCY_FLG 238 in table 202), configuring email messaging rules that notify entities of a batch status (via a USE_EMAIL_FLG 240 in table 202), dynamically specifying batch restarts that indicate a number of retry attempts and/or corresponding timeframes (via a USE_RETRY_FLG 239 in table 202), performing automatic error logging functions (via the PCF run event table 212), and customizing batch throttling functions. In an exemplary embodiment, the BTCH_ID 230 is a primary key of the PCF batch table 202 and is used as a foreign key to tables 204-214. In addition, a batch date (BTCH_DT) field 280 is a primary key of table 216 and is used as a foreign key to the PCF run batch status table 214.

Turning now to FIGS. 3, 4, and 5A-5D, an exemplary process and user interface screen for implementing the customized scheduling via the process control framework will now be described. It will be understood by one of ordinary skill in the art that the particular sequence of process steps, as well as the user interface screen layout described herein are provided for ease of explanation and are not to be construed as limiting in scope.

The process begins at step 300 whereby batch identification information is entered into the PCF user interface screen 400 at step 302. This information is populated into the PCF batch table 202. As indicated above in FIG. 2, the batch identification information entered may include a batch name that is entered into the batch name field 404 (and populated into a BTCH_NM field 231 of the table 202) and batch description entered into the batch description field 408 (and populated into a BTCH_DESC field 233). At step 304, the user enters ETL information, including, e.g., a workflow name in the workflow name field 410, which is populated by the PCF application 120 into a WF_NM field 234; a parameter file name in the parameter file name field 412, which is populated into a PARM_NM field 235; and a folder name in the folder name field 414, which is populated by the PCF application 120 into a FOLDR_NM field 236. At step 306, one or more flag fields (e.g., fields 416, 418, 420, and 422) in the user interface screen 400 are checked by the user and populated into corresponding fields in the PCF batch table 202, namely fields 237, 238, 239, and 240, respectively.

Figure 5A:
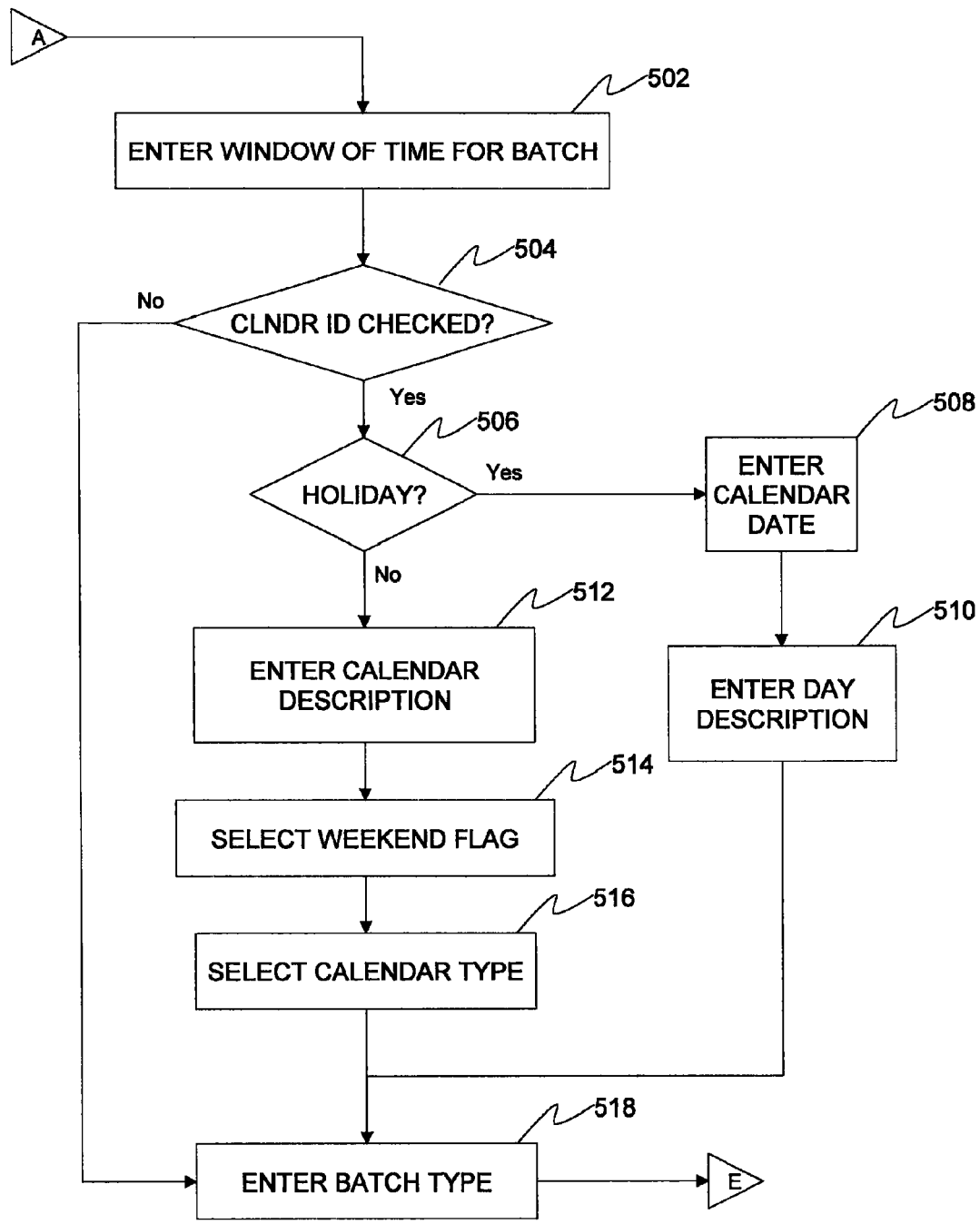
FIGS. 5A-5D are flow diagrams illustrating details of the processes described in FIG. 3 in accordance with exemplary embodiments.

If the schedule flag field 416 is checked in the user interface screen 400, a subwindow 450 is presented to the user and the process continues in FIG. 5A. The PCF application 120 sets the USE_SCHED_FLG field 237 in the table 202 to reflect this selection. At step 502, the user enters a window of time into the subwindow 450 as start and end dates in fields 452 and 454, respectively. The window definition logic 130 of the PCF application 120 populates this information into a STRT_DT field 242 and an END_DT field 244 in the table 204 in order to reflect this user input. Optionally, the user may configure the batch window of time around weekends and/or holidays via the PCF user interface screen 400 by selecting one of a HOLIDAY field 456 or a CALENDAR DAY field 458. The window definition logic 130 of the PCF application 120 sets a calendar ID field (CLNDR_ID) 246 in the table 204 to reflect this selection. If the holiday field 456 is checked at step 506, the user is provided with an option to configure the batch window around holidays and is presented with another subwindow 460 from the user interface screen 400. The user enters the calendar date (e.g., date in which the holiday falls) in a calendar date field 464 at step 508, followed by the type of holiday (e.g., New Years, Independence Day, Thanksgiving, etc.), also referred to "day description" in a corresponding day description field 466, at step 510.

Turning back to step 506, if the holiday option is not selected, but rather the calendar day field 458 has been checked, another subwindow 470 is presented to the user via the user interface screen 400, and the user enters a calendar description (e.g., run the batch on business days or every $10^{th}$ work day, etc.) in a calendar description field 474 at step 512. At step 514, the user sets a weekend flag in a weekend field 476 in order to specify whether weekends will be considered for the batch window. For example, the weekend flag may be set to 'Y' for specifying that weekends are to be considered in the batch window, or 'N' for specifying that weekends will not be considered in the batch window. At step 516, the user selects a calendar type from a calendar type field 478, which is used to determine whether the calendar date is considered as a valid work day (e.g., type set to 'INCL' specifying the calendar date is inclusive) or whether the calendar date is not considered a valid work day (e.g., type set to 'EXCL', specifying the calendar date is exclusive). Once the calendar type is selected at step 516, or alternatively, upon entering the day description for the holiday option at step 510, or alternatively, if the user does not select the calendar ID option in step 502, the process continues in step 518 whereby the user enters a batch type in a batch type field 480. The batch type field 480 is used to determine to the PCF application 120 will read the STRT_DT and END_DT fields 242 and 244, respectively. The domain values for these fields may be, e.g., daily or monthly. The window definition logic 130 of the PCF application 120 then populates the batch type into a BTCH_TYPE field 248 in the table 204. A sample PCF schedule for a defined batch window configured via the user interface screen 400 of FIG. 4 is shown in FIG. 6A. Upon completion of the entries in the PCF user interface screen 400, the process then returns to step 310 of FIG. 3. Alternatively, if the schedule field flag 416 is not checked (in step 308), the process proceeds to step 310.

Figure 5B:
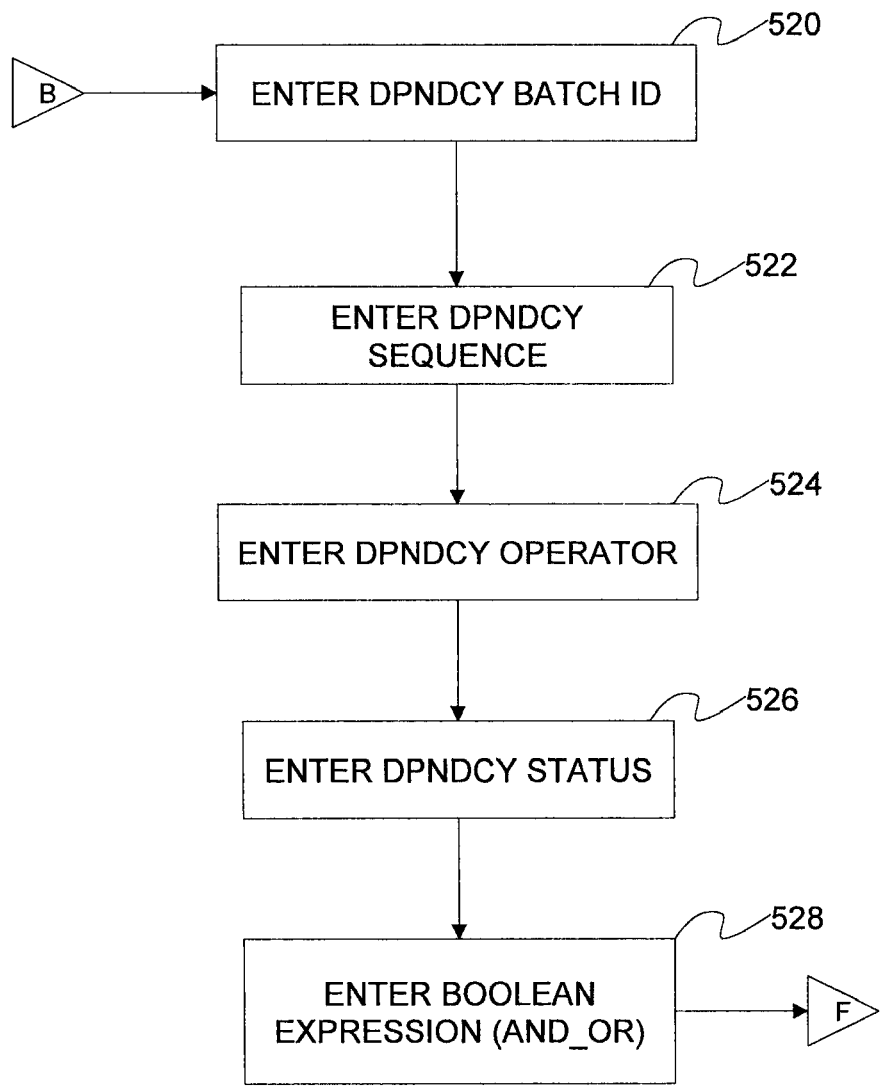
Figure 5C:
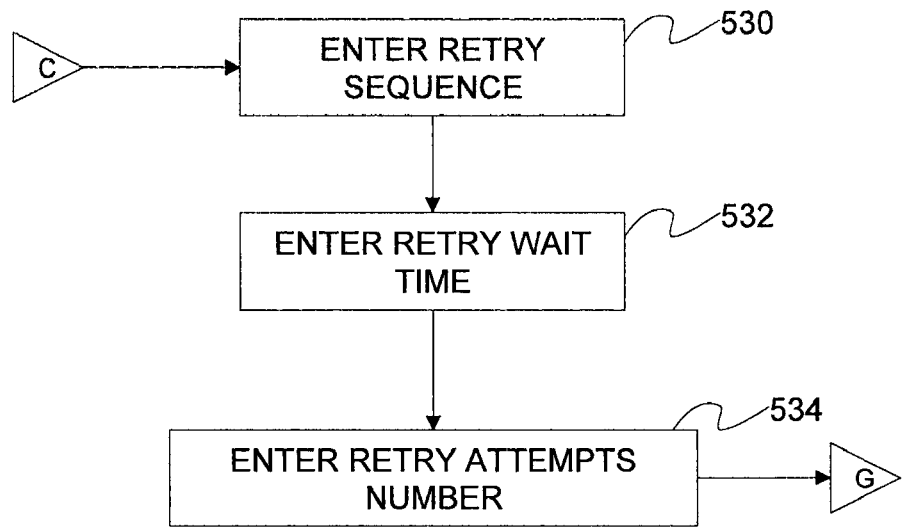
Figure 5D:
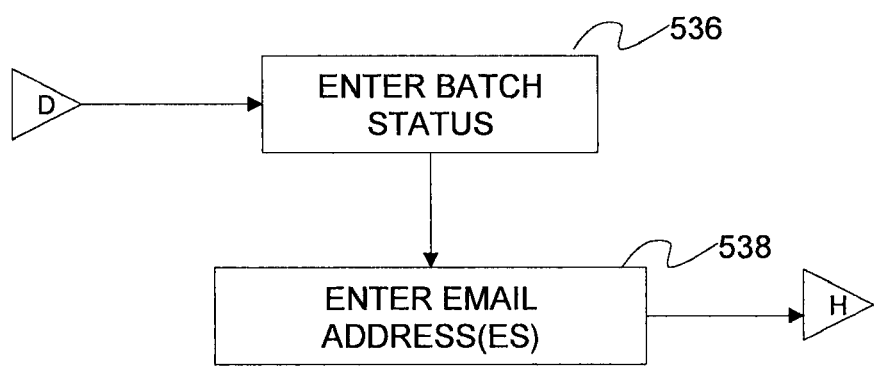

If the dependency flag field 418 is checked in the user interface screen 400, the PCF application 120 sets the USE_DPNDCY_FLG field 238 in the table 202 to reflect this selection, a PCF dependency window of the PCF user interface 122 is provided (not shown) and the process continues to FIG. 5B. The PCF dependency window, as well as a PCF retry window, and a PCF email window provided by the PCF user interface 122 may be configured in a manner similar to the user interface screen 400 of FIG. 4, although the windows would display fields corresponding to fields in their respective tables as shown in FIG. 2 rather than the batch window fields described in FIG. 4. The user enters a dependency batch ID (which corresponds to a DPNDCY_BTCH_ID field 250 of table 206) in the appropriate field of the PCF dependency window at step 520. The dependency batch ID represents an identifier for the batch that is a dependency for the current batch ID (e.g., the batch identified by BTCH_ID field 230 in PCF batch table 202). At step 522, the user enters a dependency sequence in a dependency sequence field (which corresponds to DPNDCY_SEQ field 252 in the table 206) at step 522. The dependency sequence is a number used to determine the order in which the dependencies are evaluated if "AND" and "OR" conditions are used between multiple dependencies for a given batch. At step 524, the user enters a dependency operator in a dependency operator field (which corresponds to DPNDCY_OPRTR field 254 in table 206). The dependency operator is used for the condition to determine the dependency. The domain values of the dependency operator include "=", "<", and ">".

Figure 6B:
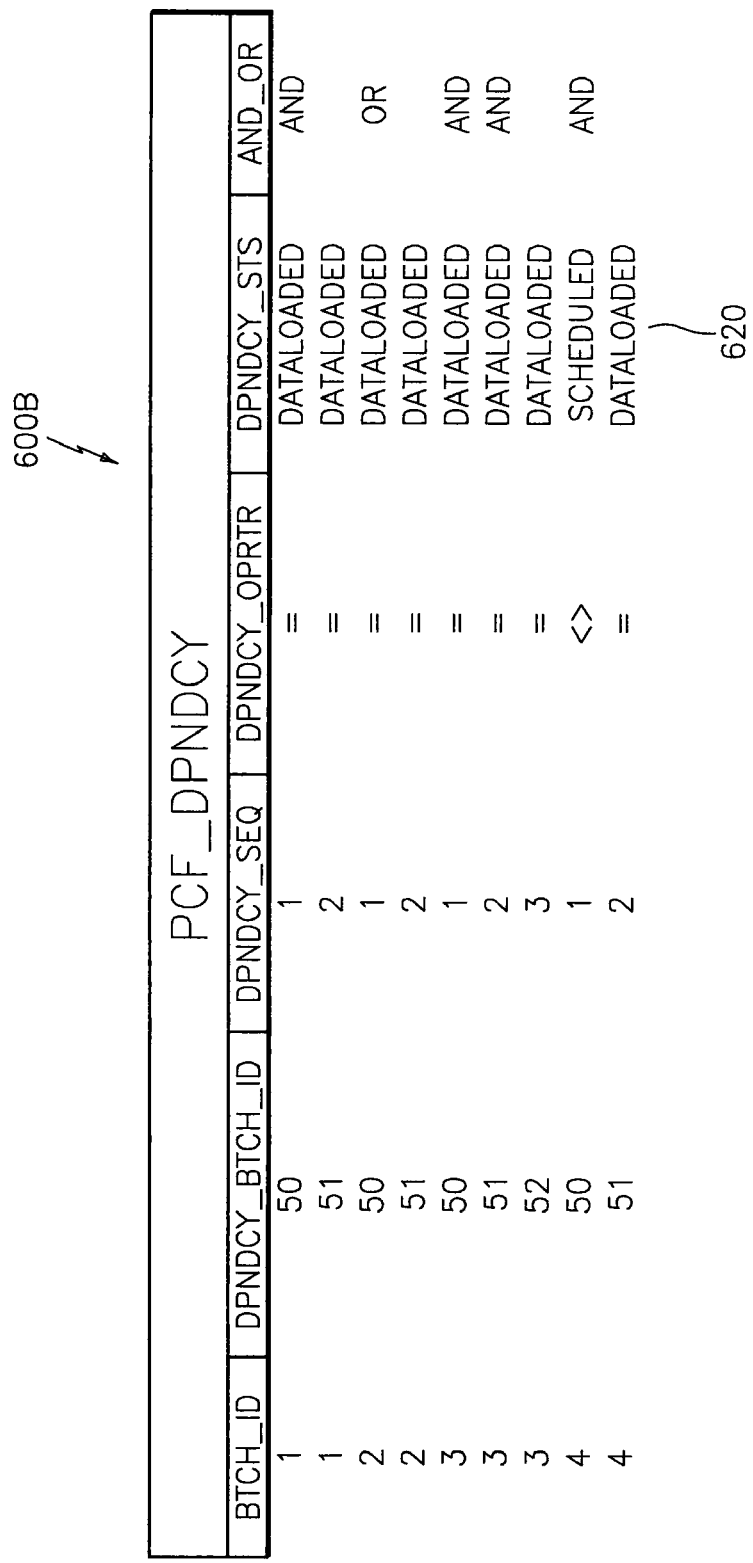

At step 526, the user enters a dependency status in a dependency status field (which corresponds to a DPNDCY_STS field 256 in the table 206). The dependency status reflects a batch status (e.g., from a BTCH_STS field 282 in the PCF Run Batch Status table 214 of FIG. 2). The batch status in field 282 of table 214 is used for the condition to determine the dependency. A domain of possible values for the DPNDCY_STS field 256 include, e.g., SCHEDULED, ERROR, LAUNCHED, RUNNING, DATALOADED, FAILED, and EXPIRED. At step 528, the user enters a Boolean expression (e.g., AND or OR) in a Boolean field (which corresponds to the AND_OR field 258 in the table 206). This reflects a condition used if there are multiple dependencies for a single batch. A sample PCF schedule illustrating defined dependencies is shown in FIG. 6B. Once these items are entered into the PCF dependency window provided by the PCF user interface 122, the process then returns to step 312 of FIG. 3. Alternatively, if the PCF dependency flag field 418 is not checked in the user interface screen 400 of FIG. 4 at step 310, the process proceeds to step 312.

At step 312, the batch retry logic 134 of the PCF application 120 determines whether the PCF retry flag field 420 is checked by the user. If so, the USE_RETRY_FLG field 239 in the PCF batch table 202 is checked to reflect this selection, a PCF retry window (not shown) is presented to the user via the PCF user interface 122, and the process continues to FIG. 5C. The user enters a retry sequence in a retry sequence field of the retry window (which corresponds to a RETRY_SEQ field 260 in table 208) at step 530. The retry sequence is a number used to determine the order of wait durations. At step 532, the user enters a retry wait time in a retry wait time field of the window (which corresponds to RETRY_WAIT field 262 in the table 208). The retry wait time reflects a minimum amount of time the process control framework will wait before retrying the batch. The unit of time for this field 262 may be in minutes. At step 534, the user enters a retry attempt number in a retry attempts field of the user interface window (which corresponds to RETRY_ATTEMPTS field 264). The retry attempts number specifies a number of attempts the system will retry the batch after waiting the amount of time specified in the retry wait time field 262 of table 208. A sample schedule including defined retry options is shown in FIG. 6C. Once these items have been entered into the retry window, the process then returns to step 314 of FIG. 3. Alternatively, if the PCF retry flag 420 is not checked in the user interface screen 400 of FIG. 4, the process proceeds to step 314.

At step 314, the messaging logic 136 of the PCF application 120 determines whether the email flag field 422 of the user interface screen 400 has been checked. If so, the messaging logic 136 of the PCF application 120 sets the USE_EMAIL_FLG field 240 in the table 202 to reflect this selection, a PCF email window (not shown) is provided and the process continues to FIG. 5D. The user enters a batch status in a batch status field (which corresponds to BTCH_STS field 266 in the table 210) at step 536. The user then enters an email address in an email address field (which corresponds to EMAIL_ADDR field 268 in the table 210) at step 538. A sample PCF schedule including defined email messaging options is shown in FIG. 6D. The process then returns to step 316 of FIG. 3. Alternatively, if the email flag 422 in the user interface screen 400 has not been checked in step 314, the process proceeds to step 316.

At step 316, the data populated in the batch table 202 is copied to corresponding fields in the run batch status table 214 via the status tracking logic 132 of the PCF application 120, which is used as a working table to perform validations on the data entered in the table 202. The validations for the table 202 are performed on the run batch status table 214 so that should a batch fail a validation effort, it will not keep other batches from running. The run batch status table 214 is a working table used to perform validations on the data in the table 202, as well as to track activities conducted with respect to batch execution operations.

At step 318, the PCF application 120 retrieves data using the populated tables of the data model shown in FIG. 2. For example, the PCF application 120 retrieves the process identified in the PROCS_NM field 232 of table 202 from the data warehouse 108. The PCF application 120 also retrieves the parameter file identified in the PARM_NM field 235 of table 202, which is designated to run the process identified above. In addition, the PCF application 120 retrieves the workflow identified in the WF_NM field 234 of table 202 from the data warehouse 108 using the FOLDR_NM field 236 of table 202.

In addition, the PCF application 120 identifies which, if any of the flag fields 237, 238, 239, and 240 are checked in the table 202. For those fields 237, 238, 239, and 240, which have been checked, the PCF application 120 retrieves the table(s) linked to the PCF batch table 202 using the primary and foreign keys for the batch identifier 230 in table 202, and executes the process and workflow defined for the batch. In conjunction with the process and workflow execution, the PCF application 120 performs initialization and validation of the data entered into the various fields for each of the populated tables 202-216. Additionally, the PCF application 120 may be configured to monitor the status of the batch execution and transmit emails or other electronic messages to various enterprise entities (e.g., the user system 104 of FIG. 1) in accordance with the data in the PCF email table 210 upon determining that conditions specified in a batch status (BTCH_STS) field 282 of the run batch status table 214. For example, batch status conditions in field 282 may include SCHEDULED, ERROR, LAUNCHED, RUNNING, DATA-LOADED, FAILED, and EXPIRED. Further, the PCF application 120 may also monitor and log retry attempts according to the defined conditions in the PCF retry table 208. The error logging and monitoring may be facilitated by the batch status tables 212, 214, and 216 where the PCF application 120 updates these tables based upon results of the batch execution. In an exemplary embodiment, the PCF run event table 212 enables the user (e.g., via a user interface screen window provided by the PCF user interface 122) to define events that will trigger an activity, which events are populated into corresponding fields of the PCF run event table 212. The events may relate to the PCF customized features described above. The run event table 212 includes an event date (EVNT_DT) field 270, an event code (EVNT_CD) field 272, and an event description (EVNT_DESC) field 274. The event date field 270 stores the date in which the event occurred. The event code field 272 stores a value assigned as a unique identifier of the event. The event description field 274 stores a user-provided description of the particular event. The event may be defined within a batch parameter file used by the PCF application 120.

In an exemplary embodiment, the PCF application 120, in conjunction with executing the process and workflow for a batch, may be configured to evaluate data in the batch dependency table 206 in view of a current batch process and scheduled batches to determine when to execute dependent batches defined in the table 206. In addition, priorities may be defined through the PCF application 120 that include, e.g., a ranking process that determines how the batches that are successfully validated and ready to run will be ordered. That is, the batches are ranked from most critical to get bumped from the schedule execution to least critical. A parameter file may be used to store and control the number of running batches. The parameter file may include a field that defines the maximum number of batches that may be launched at a given time and another field that defines the maximum number of batches that can be run at the same time. The logic for determining the ranking may be implemented in a variety of ways. For example, one rule may specify that for each hour a batch has before the end time, the batch will lose two points. Another rule specifies that for each dependency a batch has, it will receive one point. The batch with the highest assigned number of points will run first based upon the two aforementioned fields. By way of example implementation, the ranking points start at 48. For every hour a batch has before the end date, two points are subtracted. One point is added to the ranking points for each dependency the batch has. The highest ranked batches will launch first. The number of batches to launch may be determined by taking the lower of the two values of the aforementioned fields and subtracting from that lower value the number of batches running. In the event of a tie in points, the batches may be sorted by their batch identifiers, so the batch with the lower batch identifier is selected to run first.

Returning now to FIG. 3, at step 320, the PCF application 120 launches a workflow (e.g., the workflow named in the WF_NM field 234 of table 202 in FIG. 2) to begin the batch process. The batch process is executed and, at step 322, the run batch status table 214 is updated with the results of the batch execution. For example, an email sent flag (EMAIL_SENT_FLG) field 286 may be updated according to the batch status (i.e., email successfully delivered to recipient identified in the email address in the email address field 268 in table 210. Additionally, a retry count (RETRY_CNT) field 288 may be updated according to the results of the batch execution utilizing the retry option (i.e., PCF retry table 208).

At step 324, the PCF application 120 determines whether there are any new batches to configure. If so, the process returns to step 302. Otherwise, the process ends at step 326.

Turning now to FIGS. 6A-6D, PCF schedules 600A-600D, respectively, generated via the PCF processes outlined above will now be described in an exemplary embodiment. As will be clear from the illustrative embodiments, the schedules 600A-600D include columns that correspond to the fields in one or more of the data model 200 tables 202-216.

The exemplary PCF schedule 600A is configured for executing a batch process within a defined window of time, as will now be described. As shown in schedule 600A there are nine batches defined for the schedule 600A. The nine batches are numbered one through nine as illustrated in column 602 of FIG. 6A. Using the sample values presented in columns 602-610, the following batch windows are defined. Batches 1-3 will run for the entire year of 2006. Batch 1 will run once a day between 1:00 pm and 2:00 pm. Batch 2 is configured to run once a day between 1:00 pm and 2:00 pm or between 3:00 pm and 5:00 pm. Batch 3 is configured to run in January between 3:00 pm and 5:00 pm, in February and March between 4:00 pm and 6:00 pm, and from April through the end of the year between 3:00 pm and 5:00 pm. Batch 4 will run once a month for the entire year of 2006 on the first day of the month. It will only run between 1:00 pm and 2:00 pm on the first day of the month. Batch 5 will run once a month between March (inclusive) and December (inclusive) running on the $20^{th}$ day of every month. It will only run between 1:00 and 2:00 pm on the $20^{th}$ day of the month. Batch 6 is configured to run once a month between March (inclusive) and December (inclusive) running on the $20^{th}$ day of every month (same as batch 5). It will only run between 1:00 pm and 2:00 pm on the 20th day of the month. Batch 7 will run once a month between March (inclusive) and December (inclusive) running on the $5^{th}$ day of every month and between the hours of 1:00 pm and 2:00 pm. Batch 8 will run only once on the $20^{th}$ day of March 2006 between the hours of 3:00 am and 5:00 am. Batch 9 is configured to run once a month between March (inclusive) and December (inclusive) running on the $20^{th}$ day of the month. It will run sometime between 1:00 pm and 2:00 pm or between 4:00 pm and 10:00 pm on the 20th day of the month.

Turning now to FIG. 6B, the exemplary PCF schedule 600B is configured for executing batch processes according to defined dependencies, as will now be described. Using the sample data values provided in the PCF schedule 600B, the following implementation of the batches 1-4 is described. Batch 1 is configured to run only once batches 50 and 51 have gone into DATALOADED status (i.e., the dependency status applied in column 620). Batch 2 will only run once either of batches 50 or 51 goes into DATALOADED status. Batch 3 will only run once all three batches 50, 51, and 52 goes into DATALOADED status. Batch 4 will only run if batch 51 is not in the SCHEDULED status (i.e., it has started to run) and batch 51 is in DATALOADED status.

Turning now to FIG. 6C, the exemplary PCF schedule 600C is configured for executing one or more batches with defined restart attempts, as will now be described. Batch 1 is configured to retry to run up to ten times, while waiting at least five minutes before each retry attempt. Batch 2 will retry to run up to five times, while waiting at lest four hours before each retry. Batch 3 will retry to run once after waiting for ten minutes, then retry again after waiting another hour. Batch 4 will not retry to run on a failure.

Turning now to FIG. 6D, an exemplary PCF schedule 600D configured for executing one or more batches and conducting communications messaging to entities as defined by a user will now be described. Batch 1 will send an email to the email address identified in column 630 if the batch status in column 632 is DATALOADED in the PCF run batch status table 214 of FIG. 2. Batch 2 will send an email to the email address specified in column 630 if the batch status in column 632 is FAILED in the PCF run batch status table 214. Batch 3 will send an email to two email addresses specified in the column 630 if the batch status in column 632 becomes EXPIRED in the PCF run batch status table 214. Batch 4 will send an email to the address specified in column 630 when the batch status in column 632 is FAILED or EXPIRED.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for managing batch operations in an enterprise data integration platform environment, comprising:
    interfacing a process control framework application with a separate extract-transform-load tool, the extract-transform-load tool including a parameter file identifying a process control framework application name accessed by the extract-transform-load tool, wherein the process control framework application name is substituted for a name of an enterprise resource in the extract-transform-load tool such that the extract-transform-load tool accesses the process control framework application identified by the process control framework application name instead of the enterprise resource;
    the process control framework application executing a method comprising:
    defining a window of time in which a batch will run, comprising:
        entering a process identifier and a batch identifier into a batch table; and
        entering the window of time into the batch schedule table as start and end data;
    entering extract-transform-load information into the batch table, the extract-transform-load information including a workflow identifier, a parameter file identifier, and a location identifier;
    retrieving a workflow from memory via the workflow identifier and the location identifier, and retrieving the parameter file via the parameter file identifier;
    processing the batch using the process control framework application identified by the parameter file according to the workflow identifier and the parameter file, and within the window of time entered in the batch schedule table, wherein the workflow identifier specifies a workflow designated to execute a process within the batch, the process identifier defining the process, wherein the parameter file identifier specifies the parameter file identifying the process control framework application designated to run the process, wherein the location identifier identifies a location in which the workflow resides;
    mapping data from the batch table to a batch working table, the batch working table tracking a status of activity for the batch, the batch identifier used as a foreign key to the batch working table;
    updating the batch working table with results of batch execution;
    entering a number of retry attempts for the batch in a batch retry table, the batch retry table containing a foreign key identifying the batch identifier from the batch table;
    entering a wait time for each of the retry attempts in the batch retry table;
    executing the batch and retrying execution of the batch, when the execution fails, according to the number of retry attempts and wait time entered in the batch retry table;
    entering a messaging address into a messaging table, the messaging table containing a foreign key identifying the batch identifier from the batch table, the messaging table further containing a batch status field containing a value that specifies a status of the batch;
    transmitting a message to the messaging address from the messaging table when a batch status for the batch identifier matches the value in the batch status field in the messaging table;
    entering an event into an event description field of a run event table, the run event table including an event date field that contains a value specifying a date in which the event occurs;
    performing an activity associated with the event upon determining an occurrence of the event;
    entering a maximum number of batches that may be launched at a given time into a first field of the parameter file,
    entering a maximum number of batches that may be simultaneously run in a second field of the parameter file, ranking batches that are validated for execution, the ranking based upon a defined set of rules that include start and end dates of batch schedules and batch dependencies;

assigning a priority value to each of the batches; and executing the batches according to the priority value.

2. The method of claim 1, wherein defining the window of time further includes entering a calendar identifier into the batch schedule table, the calendar identifier specifying a value used to schedule the batch based upon user-defined calendar days that include holidays and non-business days, the method further comprising:

the process control framework application retrieving the calendar identifier; and the process control framework application executing the batch according to defined calendar days.

3. A system for managing batch operations in an enterprise data integration platform environment, comprising:

a computer processing device including a processor and memory; and a process control framework application stored in the memory and executing on the processor of the computer processing device, the process control framework application interfaced with a separate extract-transform-load tool, the extract-transform-load tool including a parameter file identifying a process control framework application name accessed by the extract-transform-load tool, wherein the process control framework application name is substituted for a name of an enterprise resource in the extract-transform-load tool such that the extract-transform-load tool accesses the process control framework application identified by the process control framework application name instead of the enterprise resource;

the process control framework application including window definition logic, the window definition logic implementing:

defining a window of time in which a batch will run, comprising:

entering a process identifier and a batch identifier into a batch table; and entering the window of time into the batch schedule table as start and end data;

entering a workflow identifier into the batch table, the workflow identifier specifying a workflow designated to execute a process within the batch, a process identifier defining the process;

entering a parameter file identifier into the batch table, the parameter file identifier specifying the parameter file identifying the process control framework application designated to run the process;

entering a location identifier identifying a location in which the workflow resides;

retrieving the workflow from memory via the workflow identifier and the location identifier, and retrieving the parameter file via the parameter file identifier; and processing the batch by the process control framework application, according to the process, workflow, and parameter file, and within the window of time entered in the batch schedule table;

wherein the process control framework application further includes status tracking logic, the status tracking logic implementing:

mapping data from the batch table to a batch working table, the batch working table tracking a status of activity for the batch, the batch identifier used as a foreign key to the batch working table; and updating the batch working table with results of batch execution;

wherein the process control framework application further includes batch retry logic that defines batch execution retry attempts, comprising:

entering a number of retry attempts for the batch in a batch retry table, the batch retry table containing a foreign key identifying the batch identifier from the batch table; and entering a wait time for each of the retry attempts in the batch retry table;

executing the batch and retrying execution of the batch, when the execution fails, according to the number of retry attempts and wait time entered in the batch retry table;

wherein the process control framework application further includes messaging logic that defines messaging options for the batch, comprising:

entering a messaging address into a messaging table, the messaging table containing a foreign key identifying the batch identifier from the batch table, the messaging table further containing a batch status field containing a value that specifies a status of the batch;

transmitting a message to the messaging address from the messaging table when a batch status for the batch identifier matches the value in the batch status field in the messaging table, wherein the process control framework application further performs defining an event with a condition that, once met, will trigger an activity, comprising:

entering the event into an event description field of a run event table, the run event table including an event date field that contains a value specifying a date in which the event occurs;

performing the activity associated with the event upon determining an occurrence of the event:

the process control framework application defining a priority in which batches will be executed, comprising:

entering a maximum number of batches that may be launched at a given time into a first field of the parameter file, entering a maximum number of batches that may be simultaneously run in a second field of the parameter file, ranking batches that are validated for execution, the ranking based upon a defined set of rules that include start and end dates of batch schedules and batch dependencies;

assigning a priority value to each of the batches; and executing the batches according to the priority value.

4. The system of claim 3, wherein defining the window of time further includes entering a calendar identifier into the batch schedule table, the calendar identifier specifying a value used to schedule the batch based upon user-defined calendar days that include holidays and non-business days, the process control framework application further implementing:

retrieving the calendar identifier; and executing the batch according to defined calendar days.

5. A computer program product, stored on a non-transitory computer readable medium, for managing batch operations in an enterprise data integration platform environment, the computer program product including instructions that, when executed by a computer, cause the computer to perform operations comprising:

interfacing a process control framework application with a separate extract-transform-load tool, the extract-transform-load tool including a parameter file identifying a process control framework application name accessed by the extract-transform-load tool, wherein the process control framework application name is substituted for a name of an enterprise resource in the extract-transform-load tool such that the extract-transform-load tool accesses the process control framework application identified by the process control framework application name instead of the enterprise resource;

the process control framework application executing a method comprising:

defining a window of time in which a batch will run, comprising:
 entering a process identifier and a batch identifier into a batch table; and
 entering the window of time into the batch schedule table as start and end data;

entering a workflow identifier into the batch table, the workflow identifier specifying a workflow designated to execute a process within the batch, a process identifier defining the process;

entering a parameter file identifier into the batch table, the parameter file identifier specifying the process control framework application designated to run the process;

entering a location identifier identifying a location in which the workflow resides;

retrieving the workflow from memory via the workflow identifier and the location identifier, and retrieving the parameter file via the parameter file identifier;

processing the batch by the process control framework application, according to the process, workflow, and parameter file, and within the window of time entered in the batch schedule table;

mapping data from the batch table to a batch working table, the batch working table tracking a status of activity for the batch, the batch identifier used as a foreign key to the batch working table;

updating the batch working table with results of batch execution;

entering a number of retry attempts for the batch in a batch retry table, the batch retry table containing a foreign key identifying the batch identifier from the batch table; and entering a wait time for each of the retry attempts in the batch retry table, the method further comprising:

executing the batch and retrying execution of the batch, when the execution fails, according to the number of retry attempts and wait time entered in the batch retry table;

entering a messaging address into a messaging table, the messaging table containing a foreign key identifying the batch identifier from the batch table, the messaging table further containing a batch status field containing a value that specifies a status of the batch, the method further comprising:

transmitting a message to the messaging address from the messaging table when a batch status for the batch identifier matches the value in the batch status field in the messaging table;

defining an event with a condition that, once met, will trigger an activity including entering the event into an event description field of a run event table, the run event table including an event date field that contains a value specifying a date in which the event occurs;

performing the activity associated with the event upon determining the occurrence of the event;

entering a maximum number of batches that may be launched at a given time into a first field of the parameter file, entering a maximum number of batches that may be simultaneously run in a second field of the parameter file, ranking batches that are validated for execution, the ranking based upon a defined set of rules that include start and end dates of batch schedules and batch dependencies;

assigning a priority value to each of the batches; and executing the batches according to the priority value.

6. The computer program product of claim 5, wherein defining the window of time further includes entering a calendar identifier into the batch schedule table, the calendar identifier specifying a value used to schedule the batch based upon user-defined calendar days that include holidays and non-business days, the method further comprising the process control framework application:

retrieving the calendar identifier; and executing the batch according to defined calendar days.

* * * * *